United States Patent [19]

Frankeny et al.

[11] 4,453,194

[45] Jun. 5, 1984

[54] INTEGRATED POWER CIRCUIT WITH CURRENT SENSING MEANS

[75] Inventors: Richard F. Frankeny, Elgin; Charles R. Linton, Austin, both of Tex.

[73] Assignee: International Business Machines Corporation, Armonk, N.Y.

[21] Appl. No.: 353,675

[22] Filed: Mar. 1, 1982

[51] Int. Cl.³ .......................................... H01H 47/32
[52] U.S. Cl. ................................ 361/154; 361/152; 318/685; 318/696
[58] Field of Search ............... 361/152, 154; 318/696, 318/685

[56] References Cited

U.S. PATENT DOCUMENTS

| | | |
|---|---|---|
| 3,743,850 | 7/1973 | Davis . |
| 3,778,698 | 12/1973 | Romano . |
| 3,896,367 | 7/1975 | Frantz . |
| 3,952,257 | 4/1976 | Schade, Jr. . |
| 4,017,748 | 4/1977 | Davis . |
| 4,057,743 | 11/1977 | Limberg . |
| 4,072,888 | 2/1978 | Bechtle et al. . |
| 4,127,801 | 11/1978 | Leenhouts . |
| 4,140,960 | 2/1979 | Ohsawa . |
| 4,173,030 | 10/1979 | Rabe ................................ 361/154 |
| 4,358,812 | 11/1982 | LoCascio et al. ............... 361/152 |
| 4,400,756 | 8/1983 | Cave et al. ....................... 361/152 |

FOREIGN PATENT DOCUMENTS 2421219 6/1975 Fed. Rep. of Germany .
2057714 4/1981 United Kingdom .

OTHER PUBLICATIONS

*IBM Technical Disclosure Bulletin*, "Controlled Current Gain for Integrated Circuits", P. R. Epley et al., Oct. 1976, pp. 1831-1832.

*Primary Examiner*—Reinhard J. Eisenzopf
*Attorney, Agent, or Firm*—J. B. Kraft

[57] ABSTRACT

An integrated power circuit for driving an inductor load including an integrated current sensor is provided. The integrated circuit includes a power transistor in series with the inductive load for operationally conducting a load current of at least 1 amperes and circuitry for applying a predetermined operational voltage across the power transistor. A sensing transistor having an emitter-base junction area less than $10^{-3}$ times the emitter-base junction area of the power transistor and a base terminal common with the base terminal of the power transistor is included in the integrated circuit as is circuitry for applying a predetermined voltage across the sensing transistor. The integrated circuit further includes circuitry for applying a voltage to the common base terminals to activate both the power and sensing transistors whereby a small current mirroring the load current flows through the sensing transistor. The circuitry also senses the current level of the activated sensing transistor. The sensed current may then be used to control the load current by suitable feedback circuitry.

4 Claims, 1 Drawing Figure

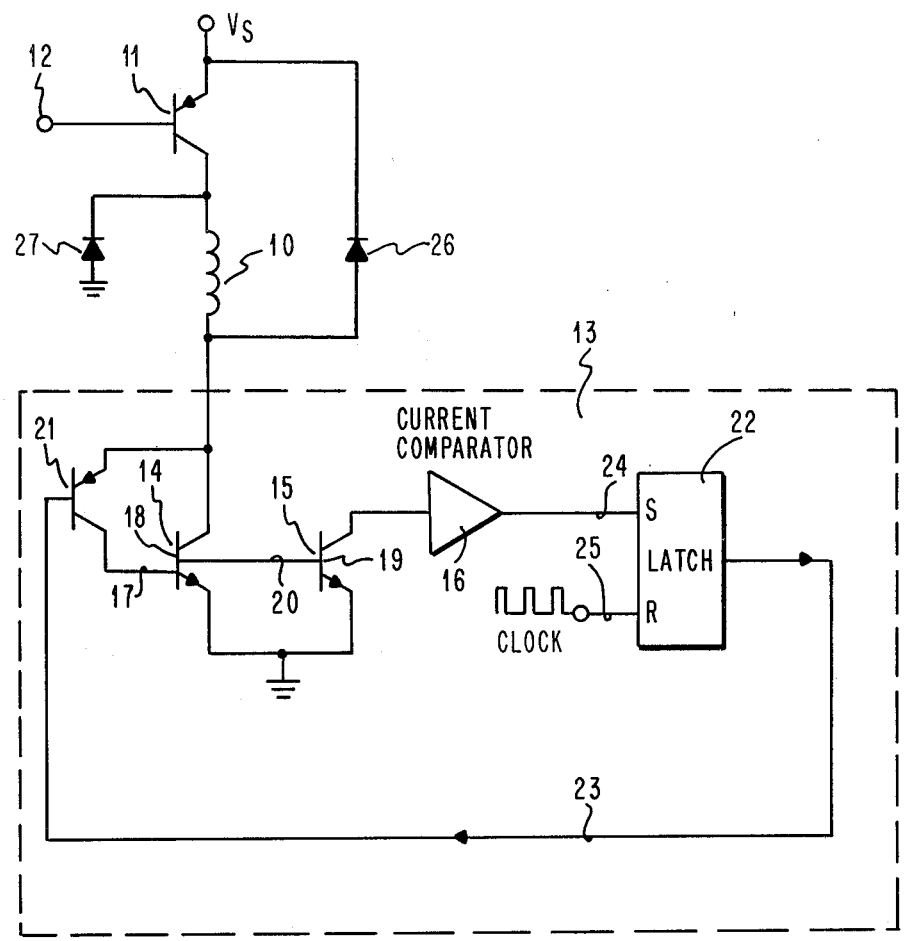

INTEGRATED POWER CIRCUIT WITH CURRENT SENSING MEANS

DESCRIPTION

1. Technical Field

The present invention relates to power to drive circuits and particularly power or drive circuits for inductor loads such as stepper motor coils.

2. Background Art

Conventional drive circuitry for inductor loads such as stepper motor coils usually consist of a power or driving transistor in series with the inductor load for operationally conducting a high load current in the order of at least 1 amperes and means for sensing the load current with appropriate feedback to thereby control the load current. Some typical inductor load drive circuits are described in U.S. Pat. Nos. 4,072,888, 4,127,801 and U.S. Pat. No. 4,412,166, entitled "A Stepper Motor Drive Circuit for Synchronous Switching of Core Winding" C. H. Crider et al, filed on Feb. 26, 1981 and issued on Oct. 25, 1983. Such inductor power or drive circuits have conventionally utilized one or more power or drive transistors which have usually been discrete devices in combination with switching means for rendering such power transistors conductive or non-conductive as well as discrete resistor sensing circuitry for monitoring load current so that the feedback may be used to switch the load current on and off to control load current. One problem with utilization of such discrete resistors is that the current is sensed by measuring the voltage across these sense resistors. Thus, a significant portion of the circuit power may be dissipated across the sense resistor and therefore not available for driving purposes unless the resistor is made as small as possible. To this end, resistors in the order of 0.4 ohms have been utilized as sense resistors in order to minimize power dissipation. However, because of the low sense voltage, it is difficult to maintain an acceptable signal to noise ratio.

Also, because of the construction techniques presently used for such power resistors, they contain a significant parasitic inductance which introduces into the sense voltage an error voltage proportional to the rate of current change.

The present invention provides an inductor load power or drive circuit including snesing means wherein the sense resistor together with its problems described above is eliminated. As will be hereinafter described in greater detail, this is achieved through the expedient of an integrated power drive circuit wherein the power transistor is arranged in an integrated current mirroring circuit with a sensing transistor.

The general concept of current mirroring by paired transistors in integrated circuits is not a new one. For example, U.S. Pat. No. 4,017,748 utilizes paired current mirroring transistor in an integrated circuit for stray voltage detection in low power battery operated signal receiving devices such as pocket pagers. It also discusses the general disadvantages of integrated circuit resistors, i.e., the substantial chip area required for them as well as the power lost in them.

U.S. Pat. No. 4,057,743 discloses a current sensing circuit in which paired current mirroring integrated circuit transistors are used together in an integrated current sensing circuit. In other words, the paired mirrored transistors actually constitute current sensing circuit itself. This current sensing circuit is not a power or drive circuit and does not drive an inductive load.

U.S. Pat. Nos. 3,743,850 and 3,952,257 and the article "Controlled Current Gain for Integrated Circuits," P. R. Epley et al published in the *IBM Technical Disclosure Bulletin*, October 1976, pages 1831 and 1832 represent general prior art teachings that a plurality of current mirroring transistors may be used for current scaling or current proportioning in integrated circuit. The proportioning or scaling is based upon comparative sizes of the emitter-base junction in these current mirroring transistors.

U.S. Pat. No. 4,140,960 is a general teaching of the use of current mirroring transistors for current control circuits. It does not relate to integrated circuits and particularly to integrated circuits containing power or drive transistors.

DISCLOSURE OF THE INVENTION

The present invention substantially eliminates all of the sensing problems involved in conventional circuits for driving inductor loads which utilize sense resistors. An integrated circuit expedient is provided for driving an inductive load including an integrated circuit power transistor connected to said inductor for operationally conducting a load current of at least 1 amperes and usually 3 or more amperes. Further included are current mirroring transistor means in the integrated circuit which serve as a sensing transistor from which the current level in the sensing transistor and consequently the load current may be accurately sensed by conventional current sensing means.

In addition to the power transistor in series with the load, the integrated circuit includes means for applying a predetermined voltage across the power transistor, a sensing transistor having an emitter-junction area less than $10^{-3}$ times the emitter-base junction area of the power transistor and a base terminal which is common with the base terminal of the power transistor, means for applying a predetermined voltage across the sensing transistor and means for applying a voltage to the common base terminals to activate both the power and sensing transistors whereby a small current mirroring the load flows through the sensing transistor. Means are included for sensing the current level in the activated sensing transistor.

In accordance with a more specific aspect of the present invention, the inductor load is a stepper motor coil, and the circuit further includes switching means responsive to the sensing means for switching the voltage across the power transistor on and off to thereby control the load current level.

BRIEF DESCRIPTION OF DRAWINGS

Referring now to the drawings, wherein a preferred embodiment of the invention is illustrated, and wherein like reference numerals are used throughout to designate like parts;

The FIGURE is a diagrammatic representation of a clocked chopper circuit which is a preferred embodiment of the present invention.

BEST MODE FOR CARRYING OUT THE INVENTION

Referring to the figure, coil 10 is representative of a coil in any conventional stepper motor through which the current is to be controlled by the integrated circuit expedient of the present invention. Coil 10 may be a coil in a typical stepper motor such as those described in previously mentioned U.S. Pat. Nos. 4,072,888 or 4,127,801. Voltage source Vs, which for the purpose of the present embodiment is about 36 volts, is applied to coil 10 through transistor 11 which serves as a switch to determine whether or not coil 10 is on or off. Standard stepper motor control means determine the stages of a stepper motor operation when coil 10 will be on or off. If coil 10 is to be on, then the circuitry will provide an appropriate signal to base terminal 12 of switching transistor 11 to activate the transistor and turn coil 10 on.

For the purposes of this description, we will assume that coil 10 is in the on or operative state, and we will now describe how the integrated circuit of the present invention senses and controls the load current through coil 10 to maintain this current at a desired level. The coil drive and control circuitry is contained in an integrated circuit unit 13 in which transistor 14 is a power transistor which drives coil 10. Power transistor 14 is selected so that when it is operational with the circuit parameters shown in the figure, a load current of at least 1 amperes will pass through coil 10.

For purposes of the present embodiment, let us assume that load current through coil 10 is to be controlled to 3 amperes. Circuit unit 13 embodies a chopper drive circuit which acts to maintain a current level of 3 amperes through coil 10. The circuit functions as follows. Sense transistor 15 is a current mirroring transistoring formed by the identical integrated circuit processing which formed power transistor 14 but having a much smaller emitter area selected such that the area of the emitter-base junction in sense transistor 15 is a small fraction of the area of the emitter-base junction in power transistor 14. For, effective results, sense transistor 15 has a base-emitter junction area of less than $10^{-3}$ times the base-emitter junction area of power transistor 14. The emitter area of current mirroring sense transistor 15 is tailored such that when the 3 ampere current flows through power transistor 14, a mirroring current of 3 milliamperes will flow through sense transistor 15.

The integrated circuit unit 13 including current mirroring transistors 14 and 15 may be produced by any conventional integrated circuit chip fabrication technique such as those described in U.S. Pat. No. 3,539,876 with emitter areas of respective transistors 14 and 15 when tailored in proportion to the current tailoring requirement described above.

Since the selected load current for coil 10 is 3 amperes, the sensing the feedback circuit embodied in circuit unit 13 is arranged so that when the current through coil 10 begins to exceed 3 amperes, power transistor 14 will be turned on and off, i.e., chopped until the load current through coil 10 drops to 3 amperes. This is done as follows. In order for power transistor 14 to be in the on or conductive state, a base input on line 17 must be provided to base 18 of power transistor 14 which is common with base 19 of sense transistor 15 through line 20. In order for the signal to be applied to base 18 on line 17, transistor switch 21 must be on. Transistor switch 21 is maintained in the on state when an output signal is provided from the latch 22 on line 23. When coil 10 is being turned on by transistor 11, latch 22 will be in the reset state so as to provide the required signal on line 23. Thus, the load current flows through coil 10 and power transistor 14 and the mirrored current flows through sense transistor 15. When the current through transistor 14 rises to and begins to exceed 3 amperes, the mirrored current in sense transistor 15 will begin to exceed 3 milliamperes. This level will be sensed by current comparator 16 and a set signal will be provided on output line 24 to latch 22. Upon reviewing the set signal, latch 22 will act to turn off transistor 14 by removing the base drive from transistor 21 on line 23. The load current will then reroute to the flyback path through transistor 11, coil 10, and diode 26. During the flyback time the load current reduces. On the next active edge of the clock (may be either rising or falling dependent on latch design) latch 22 is reset and turns transistor 14 back on by providing base drive to transistor 21 via output line 23. The load current, now reduced, flows again through transistor 11, coil 10, and transistor 14. Once again the load current rises to 3 amps wherein the entire cycle is repeated. This repetitive charge up to 3 amps and discharge through the flyback path is known as chopping. When the charging period is forced to be synchronous with a clock it is known as clocked chopping.

While the above example has been given specifically with respect to a conventional clock chopped stepper motor coil circuit, it should be clear that the present invention may be used in any integrated circuit configuration wherein the power transistor drives a current controlled inductor load.

While the preferred embodiment description has been of a clocked chopper circuit, the circuit can also be implemented as a free running chopper using a comparator with hysteresis and eliminating the latch.

In addition, the coil drive circuitry need not be within the same integrated circuit as the control circuitry (comparator and latch).

While the invention has been particularly shown and described with reference to a preferred embodiment it will be understood by those skilled in the art that various other changes in form and detail may be made without departing from the spirit and scope of the invention.

We claim:

1. An integrated circuit for driving an inductor load comprising
   a power transistor in series with said inductor load for operationally conducting a load current of at least 1 amperes,
   means for applying a predetermined voltage across said power transistor,
   a sensing transistor having an emitter-base junction area less than $10^{-3}$ times the emitter-base junction area of said power transistor and a base terminal common with the base terminal of said power transistor,
   means for applying a predetermined voltage across said sensing transistor,
   means for applying a voltage to said common base terminals to activate both power and sensing transistors whereby a small current mirroring the load current flows through the sensing transistor,
   means for sensing the current level in said activated sensing transistor, and
   means for applying the output of said current level sensing means to said means for applying a voltage to said common base.

2. The integrated circuit of claim 1 wherein said power and sensing transistors have common emitter terminals.

3. The integrated circuit of claim 1 wherein said inductor load is a stepper motor coil.

4. The integrated circuit of claim 3, wherein said means for applying the output of said current level sensing means include switching means responsive to said output for switching said voltage across said power transistor on and off, to thereby control the load current level.

* * * * *

UNITED STATES PATENT AND TRADEMARK OFFICE
CERTIFICATE OF CORRECTION

PATENT NO. : 4,453,194

DATED : 5 June 1984

INVENTOR(S) : R. F. Frankeny and C. R. Linton

It is certified that error appears in the above—identified patent and that said Letters Patent is hereby corrected as shown below:

Col. 1, line 7, delete "to", second occurrence and substitute --or--.

Signed and Sealed this

Twenty-third Day of October 1984

[SEAL]

Attest:

GERALD J. MOSSINGHOFF

Attesting Officer

Commissioner of Patents and Trademarks